United States Patent
Holborow et al.

[19]

[11] Patent Number: 6,155,531
[45] Date of Patent: Dec. 5, 2000

[54] PROPORTIONAL CONTROL VALUE

[75] Inventors: Peter A. Holborow, Califon; Daniel M. Avis, Westfield, both of N.J.

[73] Assignee: Automatic Switch Company, Florham Park, N.J.

[21] Appl. No.: 09/235,739

[22] Filed: Jan. 22, 1999

[51] Int. Cl.$^7$ .......................... F16K 31/04; F16K 31/124
[52] U.S. Cl. .......................... 251/30.02; 251/31; 251/58; 251/63.5; 251/129.08
[58] Field of Search ................ 92/138, 136; 137/596.14, 137/596.16, 596.18; 251/26, 28, 31, 30.01, 30.02, 30.05, 58, 63.5, 63.6, 129.04, 129.08, 129.15

[56] References Cited

U.S. PATENT DOCUMENTS

| | | | |
|---|---|---|---|
| 2,500,777 | 3/1950 | Timmerman, Jr. et al. | 251/30.01 |
| 2,616,449 | 11/1952 | Maha | 251/30.01 |
| 3,107,080 | 10/1963 | Priese | 251/58 |
| 3,394,632 | 7/1968 | Priese | 251/58 |
| 3,982,725 | 9/1976 | Clark | 251/58 |
| 4,014,509 | 3/1977 | Yoshino et al. | 251/31 |
| 4,087,074 | 5/1978 | Massey et al. | 251/58 |
| 4,564,169 | 1/1986 | Nordlund | 251/58 |
| 4,566,670 | 1/1986 | Nordlund | 251/58 |
| 4,647,003 | 3/1987 | Hilpert et al. | 251/58 |
| 4,949,936 | 8/1990 | Messina | 251/58 |
| 5,440,969 | 8/1995 | Shin | 251/58 |
| 5,865,419 | 2/1999 | Nelson et al. | 251/58 |

*Primary Examiner*—George L. Walton
*Attorney, Agent, or Firm*—Levine & Mandelbaum

[57] ABSTRACT

A proportional control valve has inlet and outlet solenoids controlling the pressurization and evacuation of a chamber between two pistons in a control valve of the rack and pinion opposed-piston type. The control valve can be maintained in fully open, fully closed, or intermediate positions by selectively energizing and de-energizing the solenoids. The solenoids can be of the normally open or normally closed solenoid poppet types depending on whether the control valve is to open, close or maintain its current state in the event of a power failure.

8 Claims, 4 Drawing Sheets

PROPORTIONAL CONTROL VALUE

BACKGROUND OF THE INVENTION

This invention relates to a proportional control valve for operating a larger main valve. More specifically, the invention provides for opening or closing a control valve in varying degrees and maintaining the control valve in a fixed partially open state, in addition to being able to fully open and fully close the control valve.

It is known in the art to open and close a main valve by mounting, on its actuator, a control valve of the rack and pinion opposed-piston type. In such control valves, each of two pistons is provided with a rack that engages one or more coaxially mounted pinion gears. As the pistons are translated away from one another, their racks rotate the pinion gears in one direction. As the pistons approach one another they rotate the pinion gear in the opposite direction. An example of such a control valve is sold under the logo Dynamite F-790.

Movement of the pistons is accomplished by applying positive air pressure to a space between the pistons to force them apart while relieving the pressure outside the region between the pistons. Conversely, the pistons can be forced to move toward one another by relieving the pressure between them and increasing the pressure in the region outside the space between the pistons.

Prior art control valves are operated in a fully open or fully close state depending upon whether the chamber between the pistons is pressurized or evacuated. Such prior art control valves cannot reliably be used to partially open a main valve to a predetermined degree and maintain the degree of openness once achieved.

SUMMARY OF THE INVENTION

The aforementioned problems of the prior art are overcome by the instant invention which provides for a control valve for fully opening or closing a main valve or maintaining the main valve in a partially open state by employing two solenoids to control the inlet and outlet of pressurized air to and from a chamber between the pistons in a rack and pinion opposed-piston control valve. One of the solenoids is an inlet solenoid which can be opened to allow pressurized air from a pressure source to enter the region between the pistons, and closed to interrupt the application of pressurized air to the region between the pistons.

The other of the solenoids is an outlet or exhaust solenoid which can be opened to allow pressurized air in the region between the pistons to escape, and closed to entrap pressurized air in the chamber between the pistons in order to prevent the valve from closing further.

Two partially compressed main springs, one provided between each piston and the wall of the housing in which the pistons are slidably mounted, urge the pistons toward one another.

It is therefore an object of the invention to provide a proportional control valve of the rack and pinion opposed-piston type wherein the control valve can be operated in fully open, fully closed and at fixed partially open states.

Another object of the invention is to provide a proportional control valve which can be maintained in a partially opened state without application of external energy to the valve.

Still another object of the invention is to provide a proportional control valve which can be controlled by two solenoids each of which need only be operated in a fully open or fully closed disposition for operating the control valve in a fully open, fully closed or partially open state.

A further object of the invention is to provide a proportional control valve which can respond to a power outage by automatically closing, opening or maintaining its current state at the time of the outage.

Other and further objects of the invention will be apparent from the following drawings and description of a preferred embodiment of the invention in which like reference numerals are used to indicate like parts in the various views.

DESCRIPTION OF THE PREFERRED EMBODIMENT

Figure 1:
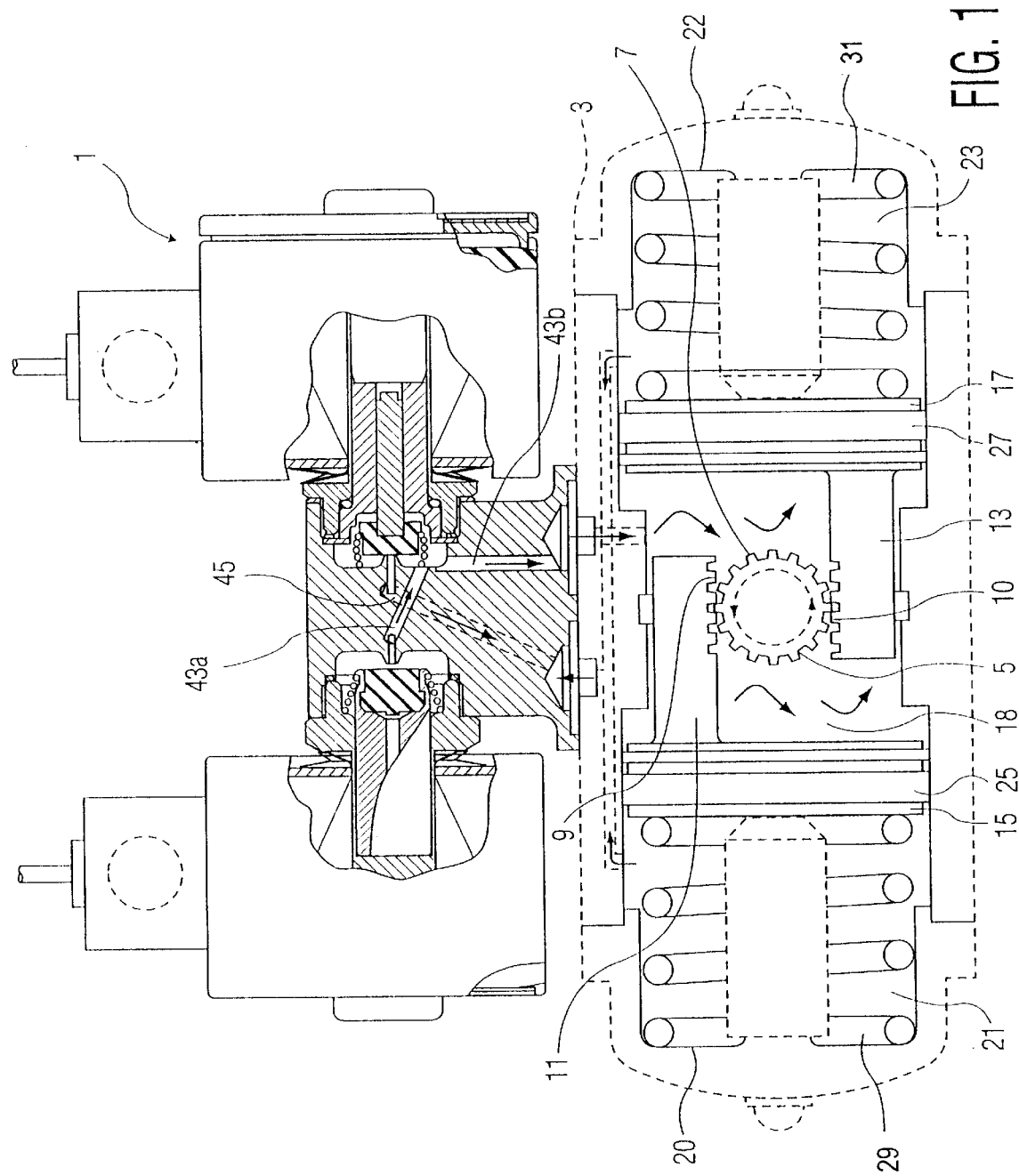
FIG. 1 is an elevation view of the apparatus of the preferred embodiment of the invention with some parts in section, the apparatus being in a first state.

Referring now to FIG. 1 of the drawings there is shown a proportional control valve 1 having a housing 3 in which there is disposed a central rotatable shaft connectable to the shaft of a main valve to be controlled. Mounted on and integral with the central shaft of the control valve 1 is a pinion gear 5 having teeth 7 meshing with the teeth 9 of a first rack 11 connected to a first piston 15 and teeth 10 of a parallel second rack 13 connected to a second piston 17. The pistons 15, 17 are slidably snugly mounted in a cylinder 19 within the housing 3. The interior of the housing cylinder 19 is divided into three chambers, one interior chamber 18 between the two pistons 15, 17 and a respective exterior chamber 21, 23 between each one the two pistons 15, 17 and a corresponding cylinder end wall 20, 22. Each of the pistons 15, 17 is surrounded with a circumferential seal 25, 27 to prevent leakage between the three chambers 18, 21, 23. Disposed within each of the external chambers 21, 23 is a compressed main coil spring 29, 31 which urges its respective piston toward the other piston.

Within an outer cylindrical wall 33 of the housing 3, in communication with the interior chamber 18, there is an opening 37 for introduction of air under positive pressure into the interior chamber 18 and evacuation of air from within the interior chamber 18 to the outside of the housing 3. An opening 39 is also provided within the outer cylindrical wall 33 of the housing 3 for bleeding air from chambers 21 and 23 when the springs 29 and 30 are compressed and for admitting air into chambers 21 and 23 when the springs 29 and 30 expand.

Mounted over the openings 37 and 39 within the control valve housing wall 33 is a valve body 41 having a bore 43a leading from the opening in a valve seat 47 to a chamber surrounding a valve seat 57 which is in fluid communication with an air outlet port (not shown) through which air exiting the chamber 18, between the pistons 15, 17, can be exhausted to the atmosphere as will be hereinafter explained. Also formed in the valve body 41 is a bore 43b leading from the chamber surrounding the valve seat 57 to the opening 37 which is in fluid communication with the interior chamber 18. A bore 45 in communication with an exhaust port (not shown) within the valve body 41, provides a bleed channel leading from the opening 39 which is in fluid communication with chambers 21 and 23, and a path for expelling air which passes through the opening in the valve seat 57 when an outlet solenoid 59 is open.

A normally closed inlet solenoid 49 has a plunger 48 made of ferromagnetic material which can be selectively attracted toward a pole piece or plug nut 46 surrounded by a coil winding 44 for exposing the opening in the valve seat 47 as will be known to those skilled in the art. An electrical current can be applied to the winding 44 for selectively opening and sealing the opening in the valve seat 47 in order to achieve a desired position for the control valve shaft as will be explained below. A bias spring 42 urges the plunger 48 toward its closed position for causing a resilient member 40 mounted on the end of the plunger 48 distal from the plug nut 46 to engage and seal the opening in the valve seat 47 controlled by the solenoid 49 when the solenoid 49 is not energized.

An air inlet port (not shown) is in fluid communication with a chamber surrounding the valve seat 47. A source of pressurized air is connected to the inlet port for creating a pressure drop across the opening in the valve seat 47 when the inlet solenoid 49 is opened, i.e., when it is energized, at which time the magnetic force exerted by the plug nut 46 lifts the valve member 40 away from the valve seat 47 thereby enabling air from the source to flow through the opening in the valve seat 47, through bore 43a, into the chamber surrounding valve seat 57, through bore 43b and, through the opening 37, into the interior pressure chamber 18 between the pistons 15 and 17. The resulting increase in pressure within the interior chamber 18 urges the pistons 15 and 17 apart so that the interior chamber 18 enlarges and the exterior chambers 21, 23 are reduced, thereby causing the racks 11, 13 to rotate the pinion 5 in a counterclockwise direction as viewed in the drawings. As the pistons 15 and 17 move apart, air can be bled from the chambers 21 and 23 through the opening 39 and channel 45 and out the exhaust port.

The opening in the valve seat 57 is selectively opened and sealed under the control of the outlet solenoid 59. The outlet solenoid 59 is a normally open solenoid. It has a plunger 58 made of ferromagnetic material which can be selectively attracted toward a pole piece or plug nut 56 surrounded by a coil winding 54. An electrical current can be applied to the winding 54 for selectively exposing and sealing the opening in the valve seat 57 in order to achieve a desired position for the control valve shaft in cooperation with the inlet solenoid 49 as will be explained below. A bias spring 52 urges the plunger 58 toward an open position for urging a resilient main valve member 50 mounted on the end of the plunger 58 away from the outlet opening in the valve seat 57. Air can then be evacuated from the chamber 18 following a path through the opening 37, channel 43b, and the opening in the valve seat 57 which is controlled by the outlet solenoid 59, and out through the exhaust port (See FIG. 3). The resulting decrease in pressure within the interior chamber 18 allows the main springs 29, 31 to urge the pistons 15, 17 toward one another thereby causing them to rotate the pinion 5 in a clockwise direction as viewed in the drawings.

When the normally open outlet solenoid 59 is energized, the plunger 58 moves the member 50 toward and into sealing engagement with the opening 57 thereby preventing air under pressure in the interior chamber 18 between the pistons 15, 17 from being evacuated to the outside of the housing 3.

Referring now specifically to FIG. 1 of the drawings, the proportional control valve 1 of the invention is shown just as it is reaching its fully open state. The normally closed inlet solenoid 49 has been opened to admit pressurized air into the interior chamber 18 between the pistons 15, 17 to force them apart. At the same time, the normally open outlet solenoid has been closed to prevent evacuation of the air from the interior chamber 18. The pressure of the air in the interior chamber 18 applies to the pistons 15, 17 a force greater than the return force of the main springs 29, 31 thereby causing the main springs 29, 31 to be compressed as the pistons 15, 17 reach the outer limit of their travel. As the pistons 15, 17 travel toward their maximum open position, the rack attached to each piston rotates the pinion 5 which is mounted on the control valve shaft, thereby turning the control valve shaft to its fully open position. The main valve has a shaft coupled to the control valve shaft and is, hence, also fully opened.

Figure 2:
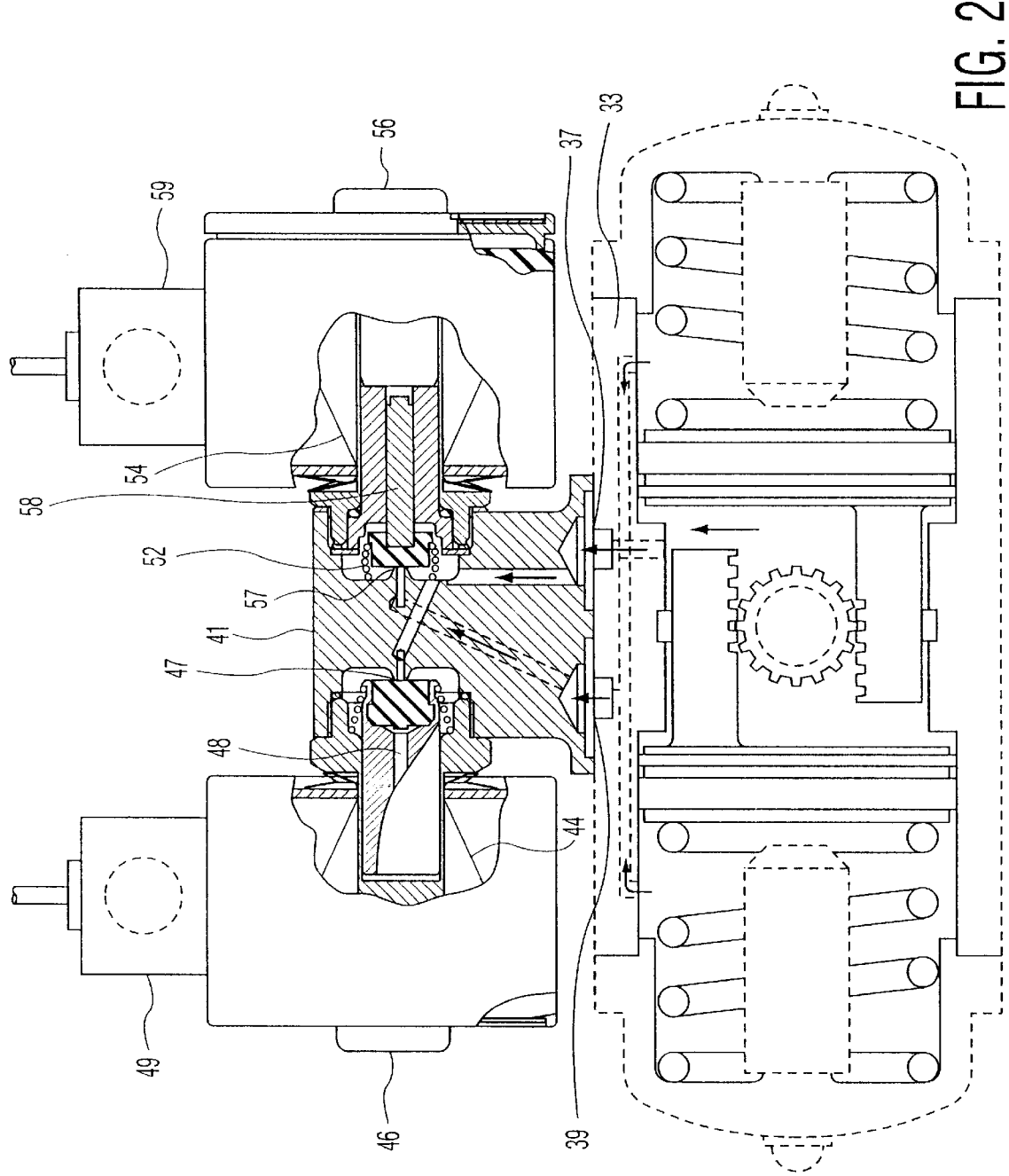
FIG. 2 is an elevation view of the apparatus of the preferred embodiment of the invention with some parts in section, the apparatus being in a second state.

The present invention also provides for the control valve 1 and, hence the main valve, to be fixed in a partially opened position as can be seen in FIG. 2. There, while the control valve 1 is in a partially open disposition intermediate fully opened and fully closed, the inlet solenoid 49 is deenergized and the outlet or exhaust valve 59 is energized so that both solenoids, 49, 59 are closed. With both solenoids closed, the volume of air in the interior chamber 18 and the pressure exerted on the pistons 15, 17 is constant, that is, air can neither enter into nor escape from the interior chamber 18. At this time the forces exerted by the main springs 29, 31 which urge the pistons 15, 17 toward one another and the resisting force exerted by the air in the interior chamber 18 are in equilibrium.

When it is desired to open the valve further and maintain it in another intermediate disposition between fully open and its prior disposition, the inlet solenoid 49 is energized for reopening it while the outlet solenoid 59 is energized for keeping it closed. The incoming supply of air to the interior chamber 18 causes the control valve 1 to begin to open further as the pistons 15, 17 are forced further apart. Once the valve has been further opened by a desired degree, the inlet solenoid 49 can again be deenergized for closing it and, thereby, maintaining the control valve 1 in a fixed disposition corresponding to the new equilibrium position of the pistons 15, 17.

Figure 3:
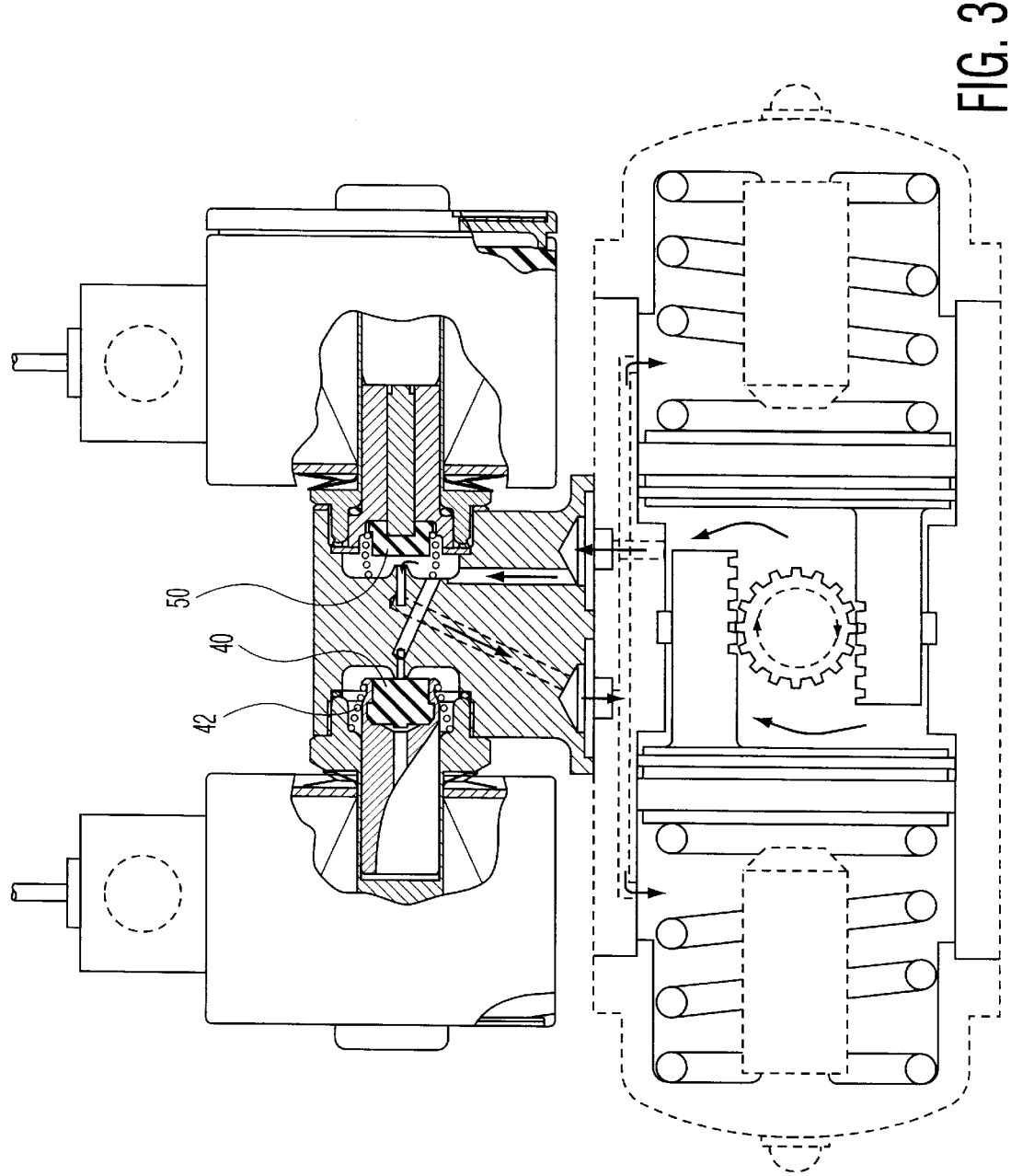
FIG. 3 is an elevation view of the apparatus of the preferred embodiment of the invention with some parts in section, the apparatus being in a third state.

Referring now to FIG. 3, in the event that it is desired to partially close the control valve 1 relative to its current intermediate disposition, the outlet solenoid 59 can be reopened by de-energizing it while the normally closed inlet solenoid 49 remains de-energized and, therefore, closed. Air can then escape from the interior chamber 18 through the opening 37 and through channel 43b under pressure exerted by the main springs 29, 31 on the pistons 15, 17 until partial closure of the control valve 1 has reached the desired degree. At that time, the normally open outlet solenoid 59 can be energized and closed to maintain the control valve 1 fixed at its current state.

Figure 4:
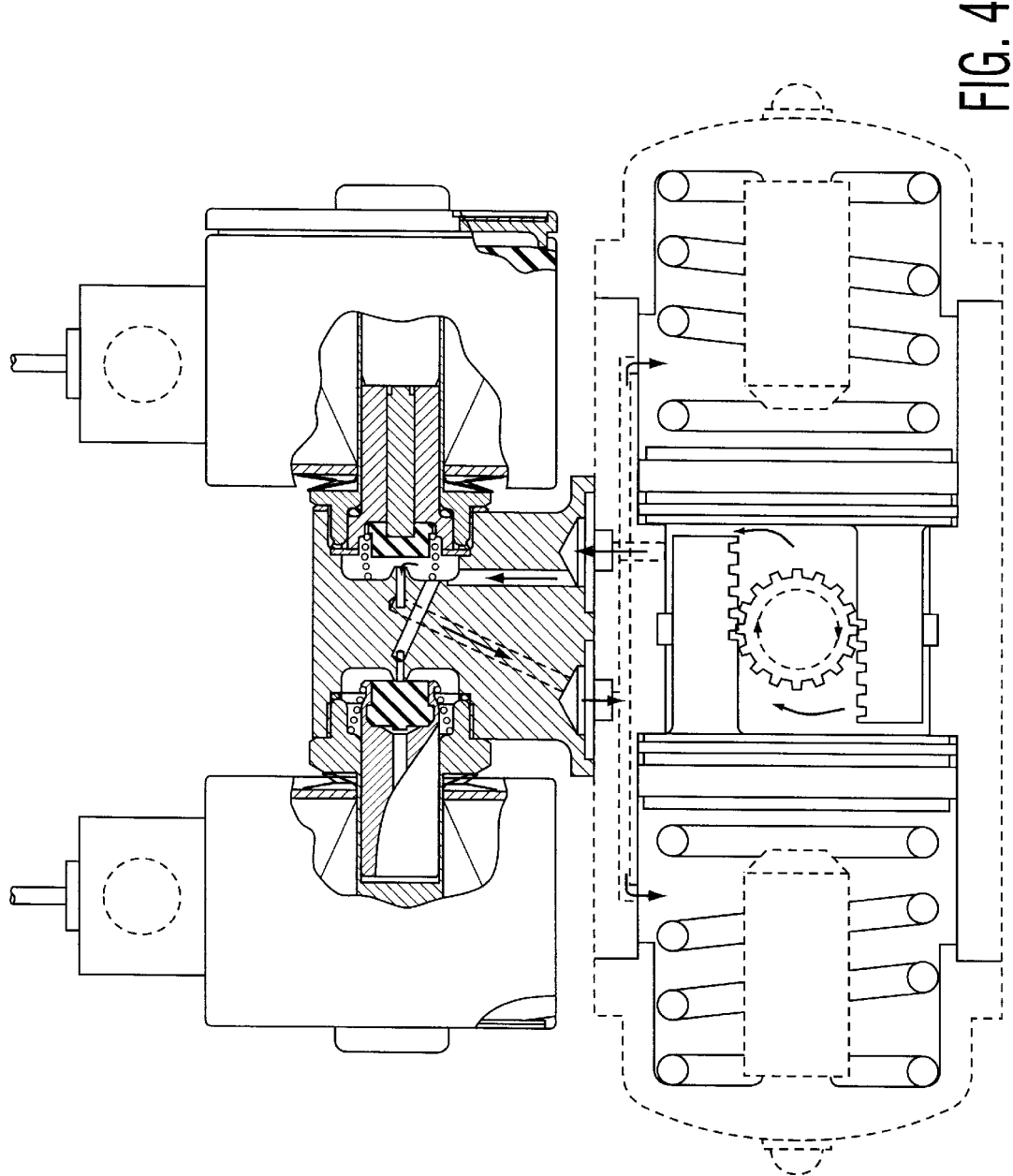
FIG. 4 is an elevation view of the apparatus of the preferred embodiment of the invention with some parts in section, the apparatus being in a fourth state.

Referring to FIG. 4, in order to fully close the control valve 1, the inlet solenoid 49 is deenergized and closed and the exhaust outlet valve 59 is deenergized and opened. At this time, the pressure of the main springs 29, 31 forces the pistons 15, 17 toward one another with the opposing the air in the interior chamber 18 being forced through the opening 37 and expelled through channel 43b to the exhaust port. The closed inlet solenoid 49 prevents further air from entering the interior chamber 18 to oppose the closing force of the main springs 29, 31 on the pistons 15, 17. During closing, the racks 11, 13 rotate the pinion 5 clockwise to its fully closed position.

It is to be appreciated that the foregoing is a description of a preferred embodiment of the invention to which variations and modifications may be made without departing from the spirit and scope of the invention. Various safety configurations can be realized in accordance with the preferred embodiment of the invention by selecting the inlet solenoid 49 and/or output valve 59 to be normally opened or normally closed. For example, if it is desired to have the control valve 1 fully close the main valve in the event of an electrical power failure, the inlet solenoid 49 can be selected to be a normally closed valve and the outlet solenoid 59 can be a normally open valve as described above. Hence during a power failure, the control valve 1 would assume the state shown in FIG. 4 with the pistons 15, 17 being able to fully retract toward one another and turn the pinion 5 to its fully closed position.

Alternatively, it may be desirable to maintain the valve in a its current fixed position upon power failure, in which case both the inlet solenoid 49 and outlet solenoid 59 could be chosen to be of the normally closed type. In this situation, during a power failure, the control valve 1 with assume the state shown in FIG. 2.

If it is desired to maintain the control valve 1 and main valve fully open in the event of power failure, the inlet valve 49 can be a normally open valve and the outlet solenoid 59, a normally closed one. In the latter case, upon failure of power, the control valve 1 will assume the state shown in FIG. 1.

What is claimed is:

1. A proportional control valve for turning a main valve shaft to any desired position between fully open and fully closed comprising a housing, control valve shaft means connectable to said main valve shaft for causing said main valve shaft to rotate in response to rotation of said control valve shaft means, piston means operatively connected to said control valve shaft means, said housing having first and second chambers separated by said piston means, said piston means being movable in a first direction for increasing the volume of said first chamber while decreasing the volume of said second chamber and in a second direction for increasing the volume of said second chamber while decreasing the volume of said first chamber, said control valve shaft means being rotatable in one of a clockwise direction and a counter-clockwise direction for opening said main valve in proportion to said piston movement in a first direction and rotatable in the other of a clockwise direction and a counter-clockwise direction for proportionally closing said main valve in proportion to said piston movement in a second direction, solenoid means mounted on said housing for selectively pressurizing one of said first and second chambers thereby causing said piston means to reduce the other of said first and second chambers and enlarge said one chamber, and return means disposed in the other of said first and second chambers and in operative engagement with said piston means for urging said piston means to reduce said one of said chambers and enlarge said other chamber, whereby the rotational position of said control valve shaft means is fixed by the position of said piston means when the opposing forces of the pressure and said return means are in equilibrium.

2. A proportional control valve in accordance with claim 1 wherein said piston means comprises two axial displaced pistons, said first chamber being disposed between said pistons and said second chamber being disposed between one of said pistons and a wall of said housing.

3. A proportional control valve in accordance with claim 1 wherein said return means comprises a spring disposed in said second chamber.

4. A proportional control valve in accordance with claim 1 wherein said solenoid means comprises an inlet solenoid having an inlet port in communication with a source of pressure and an outlet port in communication with said first chamber for selectively enabling a pressurized fluid to enter said first chamber and move said piston means for rotating said control valve shaft means in said one of said clockwise direction and said counter-clockwise direction, and an outlet solenoid having an inlet port in communication with said first chamber and an outlet port, for selectively enabling a pressurized fluid to be evacuated from said first chamber through said outlet port, and allowing said piston means to be moved by said return means for rotating said control valve shaft means in said other of said clockwise direction and said counter-clockwise direction.

5. A proportional control valve in accordance with claim 4 wherein said inlet solenoid and outlet solenoid are solenoids each of which can be opened and closed independently of the other.

6. A proportional control valve in accordance with claim 5 wherein said piston means is responsive to said inlet solenoid being open and said outlet solenoid being closed for urging said control valve shaft means toward one of said open and closed positions and to said inlet solenoid being closed and said outlet solenoid being opened for urging said control valve shaft means toward the other of said open and closed positions.

7. A proportional control valve in accordance with claim 5 wherein said piston means is responsive to said inlet solenoid being closed and said outlet solenoid being closed for maintaining said control valve shaft means in a fixed position.

8. A proportional control valve for turning a main valve shaft to any desired position between fully open and fully closed comprising an inlet solenoid having an inlet port in communication with a source of pressure, an outlet port, and electromagnetic actuator means response to an electric current for selectively opening and closing said inlet solenoid, an outlet solenoid having an inlet port, an outlet port, and electromagnetic actuator means responsive to an electric current for selectively opening and closing said outlet solenoid, control valve shaft means rotatable between a fully open position and a fully closed position, a housing having a pressure chamber in communication with the outlet port of said inlet solenoid and the inlet port of said outlet solenoid, mechanical actuator means operatively connected to said control valve shaft means and having a first surface within said pressure chamber, said mechanical actuator means being responsive to the pressure in said pressure chamber for urging said control valve shaft means toward one of said fully open and fully closed positions, and return means disposed in said chamber and operatively connected to said mechanical actuator means for urging said control valve shaft means toward the other of said fully open and fully closed positions.

* * * * *

UNITED STATES PATENT AND TRADEMARK OFFICE
CERTIFICATE OF CORRECTION

PATENT NO : 6,155,531
DATED : December 5, 2000
INVENTOR(S): Holborow et al.

It is certified that error appears in the above-identified patent and that said Letters Patent are hereby corrected as shown below:

In the title, change "Value" to --Valve--.

Signed and Sealed this

Fifteenth Day of May, 2001

Attest:

NICHOLAS P. GODICI

Attesting Officer    Acting Director of the United States Patent and Trademark Office